United States Patent [19]
Halpern

[11] 3,899,295
[45] Aug. 12, 1975

[54] INTEGRITY INDICATOR

[75] Inventor: Donald F. Halpern, Whitestone, N.Y.

[73] Assignee: Bio-Medical Sciences, Inc., Fairfield, N.J.

[22] Filed: Nov. 23, 1973

[21] Appl. No.: 418,486

[52] U.S. Cl. .......... 23/253 TP; 23/230 L; 23/232 R; 23/254 R; 53/7; 116/114 AM; 206/364; 206/459; 206/484
[51] Int. Cl. .................. B65b 31/02; G01n 31/22
[58] Field of Search ........ 23/254 R, 230 L, 253 TP, 23/232 R; 116/114 AM; 206/459

[56] References Cited
UNITED STATES PATENTS

| | | | |
|---|---|---|---|
| 1,103,985 | 7/1914 | Murray et al. | 23/253 TP |
| 2,567,445 | 9/1951 | Parker | 23/253 TP X |
| 2,787,238 | 4/1957 | Luce | 23/253 TP |
| 2,995,425 | 8/1961 | Fuhrmann | 23/253 R |
| 3,011,874 | 12/1961 | Deutsch | 23/253 TP |
| 3,093,242 | 6/1963 | Huyck et al. | 206/364 X |
| 3,221,428 | 12/1965 | Fischler et al. | 23/253 TP X |

*Primary Examiner*—Joseph Scovronek
*Assistant Examiner*—Barry I. Hollander
*Attorney, Agent, or Firm*—Anthony Lagani, Jr.

[57] ABSTRACT

A system for indicating the integrity of a normally sealed package utilizes a sensor containing a pH sensitive dye which displays a first color at normal atmospheric pH and a second color above normal atmospheric pH. An artificial atmosphere containing a basic gaseous material, which maintains the dye in its second color so long as the integrity of the sealed package is maintained, is then introduced in the package.

5 Claims, 5 Drawing Figures

PATENTED AUG 12 1975　　3,899,295

INTEGRITY INDICATOR

DETAILED DESCRIPTION

The present invention pertains to a system for visually indicating the integrity of a package, envelope, container or the like. Numerous articles and materials are packaged in the course of manufacture under special conditions which maintain or prolong their original quality. Surgical devices, for example, are packaged under aseptic conditions or sterilized after packaging as with heat or radiation. Materials subject to oxidation can be packaged under an inert atmosphere such as nitrogen. It is of course desirable that such packages retain their integrity in passing from manufacturer to consumer or user. In addition, it is often desirable to insure that products have not been tampered with nor adulterated. Thus pharmaceuticals, perfumes, alcoholic beverages and the like may have unique properties associated with well known trademarks, and it is imperative from the manufacturer's point of view to insure that the packaged product has not been opened and the contents diluted or replaced when the consumer purchases the goods. Various guarantees are often dependent on installation by a skilled serviceman, as with sophisticated electronic components, and it is important to provide a means to ascertain whether the component to be installed is in the same condition as when it left the factory.

The present invention provides a system for determining whether the integrity of a package has been maintained or whether the package has been opened, either intentionally or accidentally.

The system is intended for use with a normally sealed package, which is utilized as one component of the system. A sensor is disposed so as to be in communication with the interior of the package but visible from the outside of the package. The sensor can be merely slipped in a transparent package, printed on the packaging material or structurally integral with the package. The sensor includes a pH sensitive dye which displays a first color at normal atmospheric pH and a second color slightly above normal atmospheric pH. One of the first or second "colors" can include a colorless state, as will be apparent hereafter. Since normal atmospheric pH can vary from about 5 to just above 7, depending upon a variety of factors, especially carbon dioxide levels in the air, the color pH at which color change occurs is slightly above this range.

The pH sensitive dye can be incorporated in the sensor in any number of ways. It can be simply absorbed on a carrier such as a small dot or strip of paper or both. Alternatively it can be printed or stamped in the form of an indicia on a strip of the carrier. The carrier may be colorless (white) or colored the same or different color as one of the two or more colors of the pH sensitive dye. For example, if the dye changes from blue to yellow, the carrier can be dyed or stained with the same blue tint so that the blue indicia becomes invisible when the dye is in the blue form and visible when the dye is in the yellow form. The sensor can be simple printing on the inside of transparent packaging material utilizing a suitable printing formulation. Such printing can also be a simple dot or similar area with the explanation being printed on the reverse (outside) surface of the film.

The final component of the system is an artificial atmosphere which contains a small amount of a basic gaseous material. This atmosphere is introduced into a package in an amount at least sufficient to maintain the dye of the senor in its second color. It is to be appreciated that the atmosphere is necessarily "artificial" only in the sense that the basic gaseous material is present at the indicated level, although it additionally can be artificial for other reasons. For example, the basic gaseous material can be simply mixed with air to form the artificial atmosphere or it can be added to an already artificial atmosphere such as nitrogen.

Suitable basic gaseous material include ammonia and simple amines. Ammonia is suitable for most applications and is preferred.

Referring now to the drawings.

Figure 3:
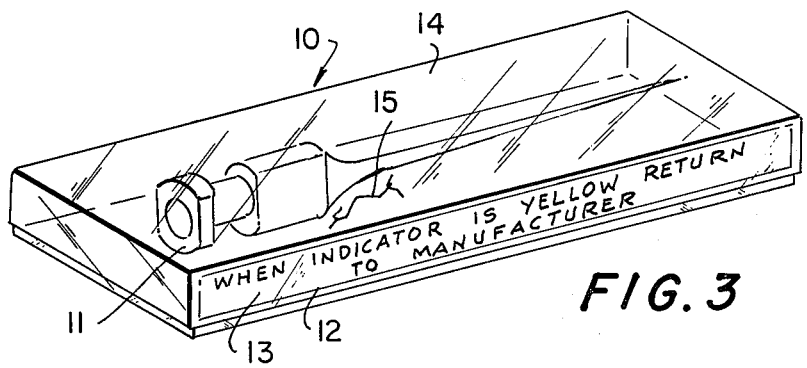
FIG. 3 depicts another embodiment in perspective view, in which the sensor is disposed in the package with its contents.

Referring now to FIG. 3, there is shown a package 10 within which article 11 is sealed. Within the package is a sensor 12 which has legend 13 printed thereon. The material with which the legend is printed contains a dye which is yellow at normal atmospheric pH but blue at a pH higher than normal atmospheric pH. The package is sealed containing an atmosphere including ammonia in just sufficient concentration to hold the dye of the sensor in its blue form. This level is sufficiently low that it is not usually detectable by the human nose.

Figure 4:
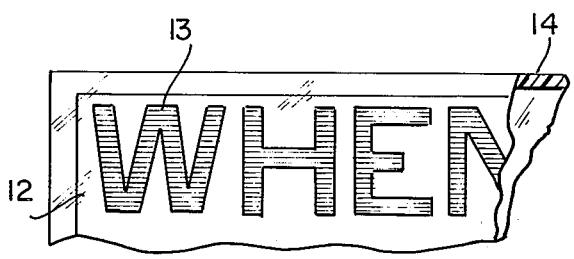
FIGS. 4 and 5 are enlarged partial views of the indicator of FIG. 3 showing the change in indicia when package integrity is lost.
Figure 5:
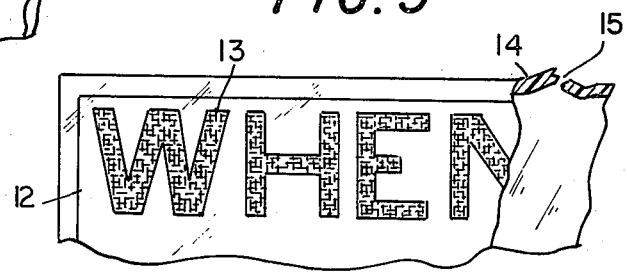

If the integrity of the package is lost, as for example by a rupture of the package wall 14 in FIG. 4 as shown at 15 in FIG. 5, ammonia escapes and the partial pressure of the ammonia drops. As the pH within the package drops, the dye of the sensor reverts to its first color. Accordingly, a user is immediately apprised of the fact that package integrity has been lost, even though the rupture may be too small for, or hidden from, visual inspection.

Figure 1:
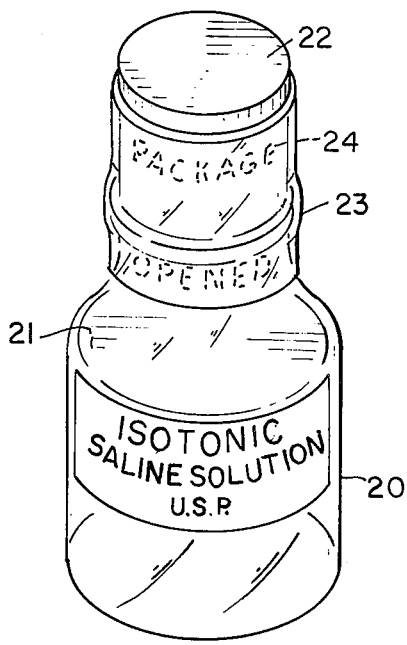
FIGS. 1 and 2, depict, in perspective view, a typical package utilizing the present system with the sensor segregated and separated from the contents of the package.
Figure 2:
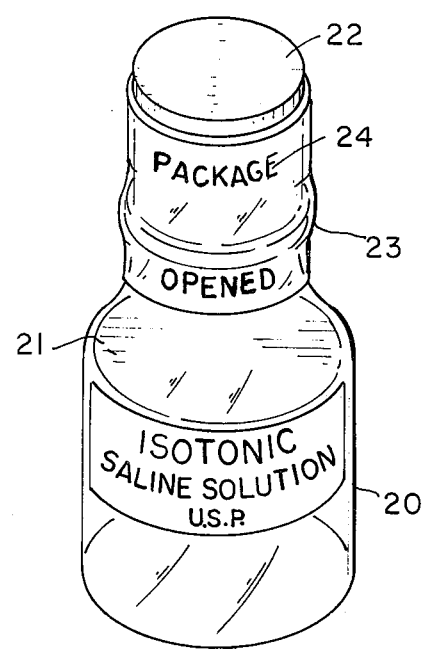

In FIGS. 1 and 2, a further embodiment is depicted. A conventional container such as a bottle 20 is filled with a desired amount of any material 21. The atmosphere above the material can be selected at will since the integrity sensing atmosphere is separated from the contents of the container. The container is closed, as with conventional cap 22. Heat shrinkable film 23 having an appropriate integrity indicia 24 printed on the inside (shown in dotted lines in FIG. 1 and in solid lines in FIG. 2) is then sealed, in conventional fashion, around the bottom circumference of the cap and the top of the container's body. Prior to sealing, an artificial atmosphere, is introduced into the region between the film and container. Utilizing a pH sensitive dye the printed indicia becomes invisible in the presence of the artificial atmosphere but reverts to its color if the seal is broken so that the artificial atmosphere escapes.

The nature of the indicia obviously is a matter of choice depending upon whether the dye goes from colored to colorless, colorless to colored, or from color to another color.

Suitable dyes of the type utilized in this invention are well known to the art and include, xylenol blue, m-cresol purple, bromocresol green, o-cresol red, cyanidine chloride, bromocresol purple, alizarin, thymol blue, bromphenol red, methyl red, acid fuchsin, brilliant yellow, logwood extract, bromthymol blue, phenol red, phenolphthalexon and the like, as well as the alkali and alkaline earth metal salts thereof.

A further embodiment involves the incorporation in the sensor of a buffer which in the absence of the basic gaseous material maintains a pH below the normal atmospheric pH range. This permits a somewhat broader selection of dyes. Salts of amines with strong acids can be employed in this fashion.

The dye is applied by formulating a simple ink, as for example by compounding with an alcohol such as butanol, including polyols such as glycerol, polyethylene glycol and the like. The vehicle is not critical and can be compounded according to the practice of the printing art. Where the active form of the dye is sufficiently soluble it can be formulated directly. The dye may also be in the form of a salt or as the free acid or free base, whichever is most convenient for solubility purposes, and then converted to the desired pH form by back titration with acid or base, whichever is appropriate, after printing.

The following examples will serve to further typify the nature of the invention without being a limitation on the scope thereof, the invention being defined solely by the appended claims.

EXAMPLE 1

To 20 parts by volume of glycerol is added one part of bromcresol purple. Eight parts by volume of 10N potassium hydroxide solution are then added to completely dissolve the dye. This ink is then employed to print an indicia, as for example the legend "WHEN THIS INDICATOR IS YELLOW RETURN TO MANUFACTURER" on a slip of paper. The printed paper is then treated with gaseous hydrogen chloride to just neutralize the dye and then inserted in a plastic package so as to be visible from the outside. A small level of gaseous ammonia sufficient to convert the dye to its basic color, about $10^{-3}$ mm partial pressure, is then introduced and the package is sealed. So long as package integrity is maintained the legend remains blue. If package integrity is lost, the legend reverts to its yellow color.

EXAMPLE 2

The ink prepared in Example 1 is utilized to print, in reverse letters, a suitable indicia on a heat sealable plastic film. Objects are then sealed in the film in an artificial atmosphere containing a small amount of ammonia with the printing on the inside of the film.

EXAMPLE 3

A printing material is prepared from 1 part by weight of cresol red, 20 parts by volume of glycerol and up to 5 parts by volume of 10N aqueous potassium hydroxide. This ink is employed in the same fashion described in Example 1.

What is claimed is:

1. A visual package integrity indicator comprising a normally sealed package, a sensor means in communication with the interior of said package and visible from the exterior of said package, said sensor means including a pH sensitive dye system which displays a first color at normal atmospheric pH and a second color slightly above said normal atmospheric pH, and an artificial atmosphere within said package containing a quantity of basic gaseous material in a quantity sufficient to maintain said dye system in its second color when said package is sealed; the color of said dye system being reversibly responsive to the presence or absence of said gaseous material thereby indicating damage to the integrity of said normally sealed package.

2. A package integrity indicator according to claim 1 wherein said basic gaseous material is ammonia.

3. A package integrity indicator according to claim 1 wherein said package is transparent and said sensor is indicia printed on an inside surface of said package.

4. A package integrity indicator according to claim 1 wherein said dye system includes a pH sensitive dye and a buffer system.

5. The package integrity indicator, according to claim 1, wherein the pH sensitive dye is bromcresol purple, cresol red, or thymol blue.

* * * * *